Jan. 17, 1956
W. L. CABLE
2,731,033
AIR CONTROL VALVE
Filed April 6, 1953
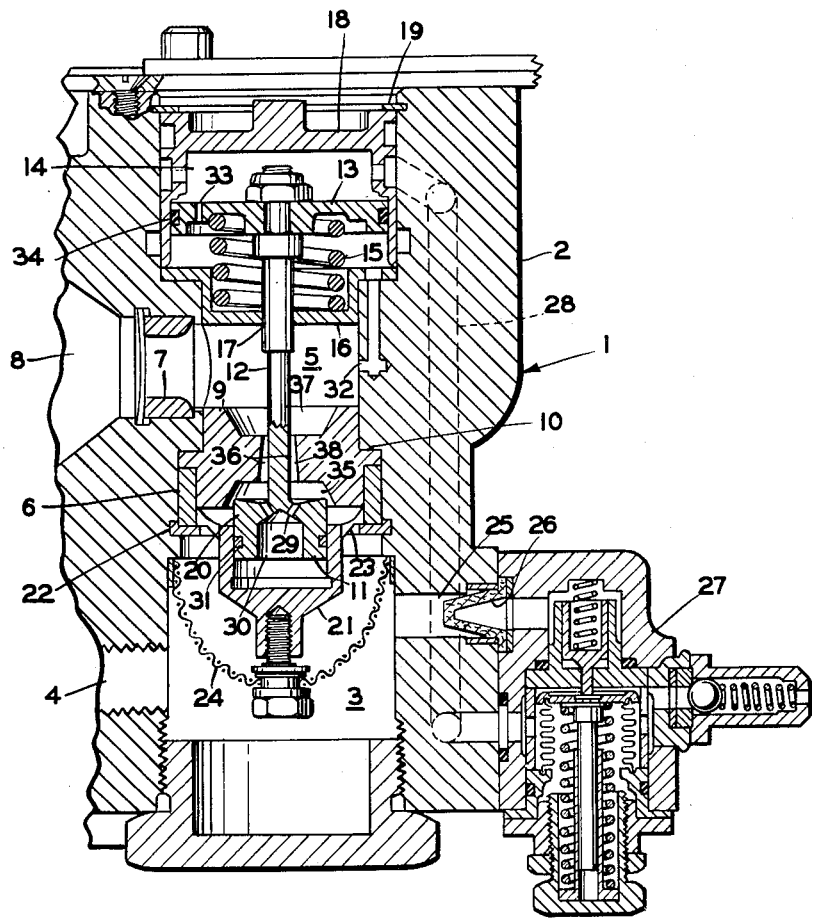
INVENTOR.
WALTER LESTER CABLE
BY
*James M. Lickels*
ATTORNEY

United States Patent Office 2,731,033
Patented Jan. 17, 1956

2,731,033
AIR CONTROL VALVE

Walter L. Cable, Teaneck, N. J., assignor to Bendix Aviation Corporation, Teterboro, N. J., a corporation of Delaware Application April 6, 1953, Serial No. 347,127

2 Claims. (Cl. 137—494)

The present invention relates to control valves and more particularly to air control valves adapted to provide a proper flow of pressurized air to the combustion chamber of a device where liquid fuel is burned in air.

In a device of the type where a liquid fuel is burned in air and a high degree of burning efficiency is essential, it is important that the ratio of air to fuel be closely controlled. Also it is desirable that the flow of air be promptly initiated upon energization of the system.

Various types of control valves have been used in the past; however, difficulty has been encountered with variation in the flow of air and also by the tendency of the valves to fluctuate.

The present invention provides a valve that provides a constant flow of air over a wide range of input pressure. Also means are provided for preventing fluctuation or hunting of the valve.

It is an object of the invention to provide an improved control valve. Another object of the invention is to provide a novel air control valve adapted to provide a constant flow of pressurized air.

Another object of the invention is to provide a novel air valve that will promptly initiate the flow of air.

Another object of the invention is to provide an air control valve that is substantially free from fluctuation.

The above and other objects and features of the invention will appear more fully hereinafter from a consideration of the following description taken in connection with the accompanying drawing wherein one embodiment of the invention is illustrated by way of example.

In the drawing:

The single figure is a cross section view of a valve embodying the invention.

Referring to the drawing a valve is indicated generally by the numeral 1 and has a housing 2. A high pressure chamber 3 is formed by the housing 2 and is adapted to be connected to a source of high pressure air (not shown) by inlet 4. The chamber 3 connects with an outlet or low pressure chamber 5 by passageway 6. The chamber 5 is connected by a nozzle 7 and outlet 8 to a combustion chamber (not shown).

A valve seat 9 is positioned by means of a shoulder 10 on the housing 2 in the passageway 6. Details of the valve seat 9 will be explained later. A valve member 11 is adapted to coact with the seat 9 and is connected by a rod 12 extending through the chamber 5 and connecting with piston 13 in a pilot chamber 14. A spring 15 is held by a plate 16 and biases the piston upwards. The plate 16 is provided with an opening 17 through which the rod 12 passes. The opening 17 is of a size that will just provide clearances for the rod 12. A piston cylinder 18 is provided in the pilot chamber 14 and is positioned by means of a snap ring 19.

The valve member 11 has a portion 20 adapted for a sliding fit in guide member 21. The guide member 21 is held in position by a snap ring 22 and has openings 23 to permit the passage of air therethrough. Also secured to the member 21 is a screen 24.

Connecting with the chamber 3 is a passageway 25 having a filter 26 mounted therein and connecting to an air reducer valve 27. The air reducer valve 27 may be of the spring loaded type and a detailed explanation thereof is omitted inasmuch as it is not a part of the present invention. Connecting from the reducer valve 27 is a passageway 28 connecting the output of the valve 27 with the chamber 14.

The valve member 11 has a passageway 29 connecting a counterbore portion 30 in the portion 20 with the chamber 5 in order that the pressure on both sides of the valve member 11 is balanced and movement thereof is dependent upon movement of the piston 13. Sealing means 31 may be positioned between the member 20 and guide 21.

A passageway 32 in the housing 2 provides means to equalize the pressures above and below the retaining plate 16. A bleed hole 33 is provided in the piston 13 to prevent excess pressure from building up in the chamber 14. Sealing means 34 are provided between the piston 13 and the member 18.

A novel feature of the invention is the valve seat 9 which has nozzles 35 and 36 effectively in series. The nozzle 36 terminates in a counterbore portion 37. The throat of the nozzle 35 is larger than the mouth of the nozzle 36. The sides of the nozzle 36 form an angled throat 38 which directs the air toward the valve rod 12 and away from the equalizing passage 32.

In operation high pressure air enters through the opening 4 and passes through the passage 25 reducing valve 27 and passageway 28 into the chamber 14. With the chamber 5 at atmospheric pressure the piston 13 will be forced downward against the bias of spring 15 thereby opening the valve member 11. This permits high pressure air to pass from a chamber 3 through screen 24 and openings 23 through nozzles 35 and 36 into the chamber 5 whence it flows outward through the nozzle 7 into the combustion chamber 8. The retaining plate 16 is fitted around the shaft 12 so that there will not be too great a pressure differential in the chamber 5 due to velocity through the valve 11 and nozzles 35 and 36. The equalizing passage 32 serves to equalize pressures above and below the retaining plate 16 yet does not subject the piston to velocity shock. The valve seat 9 is contoured to provide a progressively greater opening as the valve member 11 is moved away therefrom.

As the high pressure air enters the nozzle 35 it is directed to the mouth of the nozzle 36. The resulting direction and velocity of the air from the nozzle 35 together with the entrance coefficient of nozzle 36 tend to reduce the turbulence and also the impact pressure of the entering air. The angled sides of the throat 38 directs the air towards the valve rod 12 and away from the equalizer passage 32 thus subjecting the passage 32 to static rather than velocity pressure.

The area of the piston 13 and the valve 11 are so selected in consideration with the main supply pressure as admitted into the chamber 3 and the pressure as reduced by the reducer 27 so that the differential in pressure across the piston 13 together with the force due to the spring 15 will maintain a substantially constant pressure downstream of the valve 11.

Although only one embodiment of the invention has been illustrated and described various changes in the form and relative arrangement of the parts, which will now appear to those skilled in the art, may be made without departing from the scope of the invention.

What is claimed is:

1. In a pressure responsive valve of the character described including a piston operated valve member to control axial flow of air from a high pressure chamber to an opposed low pressure chamber, a thickened annulus fitted in a passageway between the two chambers and having a frusto-conical well in each of the opposite ends thereof, the wider diameters of which wells extend into the opposed chambers, and the annulus having a reduced frusto-conical passage axially connecting the narrower end of one well with that of the other, the wider end of the axial passage facing the high pressure chamber, the piston including an elongated stem connecting the piston at one end with the valve member at the other end and passing axially and freely through the reduced frusto-conical passage, the low pressure chamber including a passage extending laterally therefrom and communicating with a chamber below the piston, the reduced conical passage serving to communicate air flow from the high pressure chamber to the low pressure chamber and inward toward the valve stem and away from the lateral passage, and the narrower end of the well communicating with the high pressure chamber providing a seat for the valve member.

2. A valve mechanism comprising a piston, a servo fluid pressure chamber in which said piston is slidably mounted, a high fluid pressure chamber and an opposed low fluid pressure chamber, said chambers being in axial alignment, a valve member to control axial flow of fluid from the high pressure chamber to the opposed low pressure chamber, a wall separating said opposed chambers, said wall having opposite sides and a frusto-conical well in each of said sides, one of said wells having a flared end opening from said high fluid pressure chamber and the other of said wells having a flared end opening into said low fluid pressure chamber, said wall having a reduced frusto-conical passage axially connecting the narrower end of one well with that of the other, said reduced passage having a relatively flared end opening from the well of the high pressure chamber and a relatively constricted end opening into the well of the low pressure chamber, an elongated stem operatively connecting the piston with the valve member and extending axially and freely through the reduced frusto-conical passage, the low fluid pressure chamber including an outlet passage extending laterally therefrom, the narrower end of the frusto-conical well opening from the high pressure chamber providing a seat for the valve member, the low pressure chamber including a second passage extending laterally therefrom and directing fluid from said low fluid pressure chamber to said servo fluid pressure chamber below the piston, the reduced passage serving to direct a flow of fluid from the high pressure chamber to the low pressure chamber, the restricted end of said reduced passage directing the flow of fluid toward the stem and away from the outlet passage and the second passage extending laterally from the low pressure chamber, spring means biasing the piston upwardly, and passageway means for applying a controlled fluid pressure to the servo fluid pressure chamber above the piston to control the position of the piston and thereby the position of the valve member.

References Cited in the file of this patent

UNITED STATES PATENTS

| | | |
|---|---|---|
| 1,184,761 | Lytton | May 30, 1916 |
| 1,637,764 | Coles | Aug. 2, 1927 |
| 1,821,272 | Petersen | Sept. 1, 1931 |
| 1,962,520 | O'Malley | June 12, 1934 |
| 2,305,975 | McKinley | Dec. 22, 1942 |

FOREIGN PATENTS

| | | |
|---|---|---|
| 254,511 | Germany | 1912 |